J. & S. Sawyer,
Making Hoops.
No. 1173. Reissued Apr. 16, 1861.
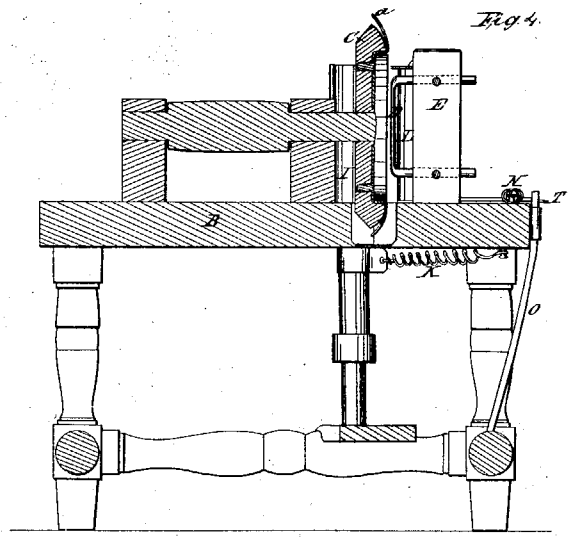
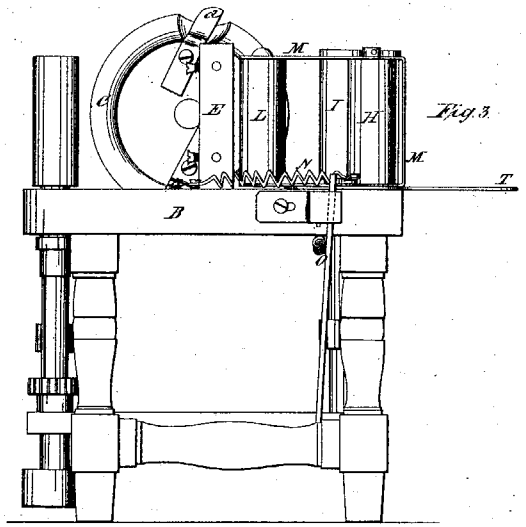
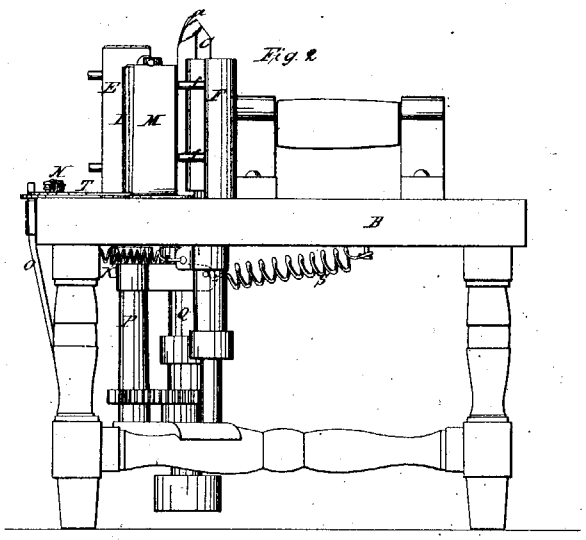
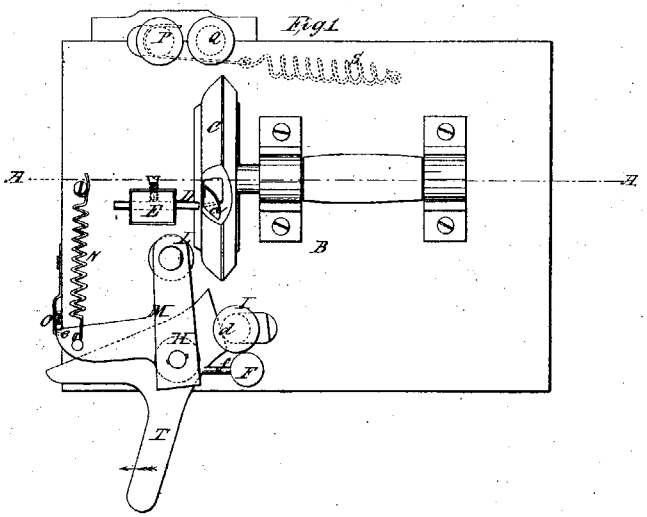
AM. PHOTO-LITHO. CO. N.Y. (OSBORNE'S PROCESS.)

UNITED STATES PATENT OFFICE.

AMERICAN HOOP MACHINE COMPANY, OF FITCHBURG, MASSACHUSETTS, ASSIGNEES OF JOSEPH SAWYER AND SYLVESTER SAWYER, OF SAME PLACE.

IMPROVED HOOP-MACHINE.

Specification forming part of Letters Patent No. 14,833, dated May 6, 1856; Reissue No. 1,173, dated April 16, 1861.

*To all whom it may concern:*

Be it known that JOSEPH SAWYER and SYLVESTER SAWYER, both of Fitchburg, in the county of Worcester and State of Massachusetts, have invented certain new and useful Improvements in Machines for Planing Hoops for Barrels and other Casks, of which the following is a full, clear, and exact description, reference being had to the accompanying drawings, in which—

Figure 1 is a plan; Fig. 2, an end elevation; Fig. 3, a front elevation; Fig. 4, a section upon the line A A of Fig. 1.

In machines for shaving hoops it is necessary that the device which holds the hoop up to the cutter-head should be sufficiently rigid to furnish a firm bed to the hoop and prevent it from yielding under the action of the cutters, at the same time that it shall be capable of yielding to permit the passage of knots. Without this latter provision wherever a knot occurred the hoop would be pressed in toward the cutter and a portion of the interior surface of the hoop would be gouged out and an imperfect hoop would be formed. It is also necessary, in order that the interior surface of the hoop may be planed smooth, that the cutter be accompanied by a rest both in advance and behind it and upon the same side of the hoop with the cutter-head, to prevent the hoop from being forced onto the cutters and destroyed.

To accomplish these ends is the object of the first part of this invention, which consists in the employment of bearings before and behind the cutting-point and upon the side of the hoop to be dressed, in connection with a yielding roller or other suitable device upon the undressed side, whereby the dressed side of the hoop is preserved in an unvarying plane uninfluenced by the knots which may exist upon the opposite surface.

In the said drawings, B is the table which supports the operating parts of the machine. C is the cutter-head, to which the cutters *a* are secured, and to which a rotary motion is imparted by power applied to the drum W upon its shaft or by any other suitable means. D is a rest or bearing for the dressed surface of the hoop, which is secured to the vertical post E, rising from the table. This rest projects within the surface of the cutter-head, which is hollowed out for the purpose, and is set with its bearing-surface or that surface against which the hoop rests in the plane, or very nearly so, in which the cutters revolve in this position. It is fixed by the confining-screws *m*. H and I are the feed-rolls, one of which is allowed to yield to accommodate the distance between them to hoops of varying thickness. Where the end of the hoop is to be tapered in the machine to form the lap, as will be presently described, one of these rolls (the one upon the dressed side of the hoop) is caused to act as the exterior rest, or that in advance of the cutting point, and in such case this roll runs in a yielding bearing and is held up to its work by the spring K.

The hoop is conducted to the feed-rolls by the guide-pins *f*, which project from a fixed post, F, rising from the table, and after leaving the feed-rolls it is held up to the cutter-head by the roll L. This roll is hung in a frame, M, which pivots round the axis of the feed-roll H, the roll being brought up to its work by the spring N, one end of which is attached to its carrying-frame M and the other to the table. The frame M is thus brought up against the stiff spring O, for a purpose which will be described hereinafter. Immediately behind or within the cutting-point the finished portion of the hoop is supported by the interior rest D, and the roll L, while it keeps the hoop steadily up to the rests I and D and prevents it from yielding under the action of the cutters, is still allowed to yield on the arrival of a knot, by which the gouging of the hoop at these points is prevented. By means of this pressure-roll L in connection with the rests upon each side of the cutting-point, an even, perfect face may be given to the interior surface of the hoop irrespective of the irregularities or knots upon its outer surface. The feed-rolls P and Q carry the finished hoop out of the machine, the roll P being brought up to its work by the spring S. (Seen dotted in Fig. 1.)

The second part of this invention consists in an improved method of tapering the hoop for the lap. Where this is to be done in the machine the exterior rest should be allowed to yield so that it may be forced out of the way and allow the hoop to be thrown out of the plane in which the cutters revolve. For this purpose the following device is employed.

The roll I, as before stated, being held up to its work by the spring K, a hand-lever, T, of the form represented in Fig. 1, is pivoted to the table, and when forced by the operator in the direction of the arrow, Fig. 1, it bears at *c* upon the stiff spring O, by which means this spring is caused to yield and the roll L is allowed to force the end of the hoop against the cutters. At the same time the lever T presses at *d* against the shaft of the roll I and causes it to yield, and thereby permit the end of the hoop to be borne over toward the cutters. This device is brought into operation only upon the extreme end of the hoop, which is thereby tapered off, as required for the lap. The feed-rolls are driven by any suitable connection with the motive power, which need not be here described.

It is obvious that the mechanism for tapering the hoop may be dispensed with when it is not required to perform this operation in the machine, and also that other modifications may be made in the details of the machine without altering the principle of the invention—as, for instance, by substituting a saw in place of the cutters *a*, the rests before and behind the saw and the roll L being retained.

What is claimed as the invention of the said JOSEPH SAWYER and SYLVESTER SAWYER, is—

1. The combination of the rests before and behind the cutting-point with the yielding roll L, when the former are on the side of the hoop to be dressed and the latter bears upon the undressed or knot side, for the purpose set forth.

2. The within-described combination of the rest D and the pressure-roll L with the hollow-faced cutter-head C, operating in the manner substantially as set forth.

3. The method herein described of tapering the hoop for the lap by means of the lever T and spring-stop O operating in the manner and for the purpose set forth.

NORMAN STONE,
*President of A. M. Hoop Machine Co.*

Witnesses:
C. H. BROWN,
GEORGE ROBBINS.